United States Patent Office 3,252,948
Patented May 24, 1966

3,252,948
INTERPOLYMERS OF THE M-FLUOROANILIDE OF METHACRYLIC ACID
Georg Manecke, 6 Munsterdamm, Berlin-Steglitz, Germany, and Siegfried Singer, 84 Ringstrasse, Berlin-Lichtenfelde, Germany
No Drawing. Filed Aug. 19, 1960, Ser. No. 50,597
8 Claims. (Cl. 260—80.3)

This invention relates to new polymeric compounds and to the method of making them and, in particular, to new reactive polymers characterized by a high concentration of 2,4-dinitro-5-fluoro-phenyl groups, whereby said polymers are capable of forming new stable chemical entities with compounds containing amino groups.

Attention has been called in recent years to reactive high polymers capable of acting as insoluble carriers for proteins, without impeding substantially the protein activity. In a system wherein proteins are bound to a solid macromolecular substance, a specific reaction which might occur between the bound proteins and any other substance present in the same medium can be measured and evaluated without perturbing the said reaction medium, especially without contaminating it.

In carrying out various reactions effected by enzymes and similar biologically active agents, it is frequently extremely difficult to remove such enzymes from the products of the desired reaction. The process of removal may involve complex steps of denaturation and decomposition and, in some cases, may adversely affect these reaction products. Furthermore, the active enzyme is lost in this way and cannot be employed again for the catalysis of the desired reactions. By use of the resins which are the object of this invention these difficulties may be completely avoided since the active substance can, without losing its catalytic activity, be strongly bound to an insoluble material and hence may be repeatedly used and may be readily and completely removed from the reaction products, for example by a simple filtration. Alternatively, the active but insoluble enzyme-resin complex may be introduced into a column and the solution containing the materials which it is desired to cause to react can be passed continuously through such column and the uncontaminated reaction products continuously removed.

Similarly, antigens and antibodies can be bound to certain high polymer carriers leading to serologically active insoluble adsorbents of therapeutical interest.

In a similar fashion certain dyes can also be bound to high polymer forming thus non-diffusing dyes.

Attempts have been made heretofore to prepare insoluble reactive polymers yielding a product capable of reacting with proteins and to bind said proteins leading to a further polymer-protein complex which displays substantially the properties of the unbound protein. However, these attempts have been of very limited utility and incapable of providing a product able to bind useful amounts of proteins. Furthermore, the suggested products displayed other disadvantages. The amount of protein bound to the polymer forming this stable polymer-protein complex did not exceed 15 mg. protein per 1 gm. polymer in the case of p-amino-benzylether of cellulose (Campbell, Luescher and Lerman), diazotated poly-amino-styrene (Grubhofer and Schleith) and poly-isocyano-styrene (Skogseid). It was, however, possible to bind 96 mg. of protein per 1 gm. resin to a polymer obtained by chlorination of Amberlite XE 64 (Isliker) (crosslinked with polyacrylic acid) but due to the weakness of the bond between the polymer and the protein, the complex thus obtained was relatively unstable and the bound protein was too readily removed from the polymer.

It is known that a compound containing a dinitro-fluoro-phenyl group is capable of reacting with compounds containing amino-groups such as amino-acids and proteins leading to the formation of stable, soluble compounds.

By the inventive process, however, high polymers have been prepared containing large numbers of 2,5-dinitro-5-fluoro-phenyl groups in each polymer molecule and such polymers have been shown to react with proteins whereby up to 250 mg. protein is firmly bound to one gram of polymer and the polymer-protein complex has been shown to possess substantially the properties of the unbound protein.

It is an object of the present invention to provide a new polymeric compound containing a high concentration of 2,4-dinitro-5-fluoro-phenyl groups.

It is a further object to provide reactive high polymers, which are capable of reacting with compounds containing amino groups forming with them new stable chemical entities.

It is still a further object to provide reactive, insoluble high polymers which due to their high concentration of 2,4-dinitro-5-fluoro phenyl groups are capable of reacting with proteins forming with them new insoluble chemical entities which display substantially the properties of the unbound protein.

It is still a further object to provide a method for obtaining aforesaid polymers. Further objects will become clear from the description which follows and the appended claims.

It has been found that polymers having the desired properties may be prepared through the copolymerization of a polymerizable compound containing m-fluorophenyl groups, preferably the m-fluoroanilide of methacrylic acid, with any other polymerizable substance of the group of chemical compounds containing double bonds, such as acrylic acid and its derivatives preferably with acrylic acid. In order to prepare a completely insoluble polymer, at least one cross-linking agent may advantageously be added during the polymerization, preferably divinyl benzene. The product obtained by said method is then nitrated by use of conventional procedures to introduce into groups into the benzene rings of the described polymers, whereby up to 60% of such rings are doubly nitrated. The process of copolymerization is advantageously carried out in a sealed reaction tube at temperatures between 20° C. and 100° C., preferably between 50° C. and 85° C.; the reaction time is 12 to 60 hours, preferably 24 to 48 hours. The copolymerization reaction is advantageously catalysed by the presence of peroxides, preferably benzoyl peroxide.

The process of nitration is carried out advantageously at −3° C.–0° C. with a nitration mixture consisting of $HNO_3$ and $H_2SO_4$, whereby no splitting off of fluorine was observed.

The copolymers produced by the method described above are characterized by a high concentration of 2,4-dinitro-5-fluoro-phenyl groups and display a strong tendency to react with compounds reactive to said 2,4-dinitro-5-fluoro-phenyl groups such as amino compounds, more particularly, amino-acids and proteins forming with said reactive compounds new stable complexes. The copolymer provided by the method described above is capable of binding up to 250 mg. protein per 1 gm. polymer without inactivating the protein and the complex so formed display substantially the properties of said unbound proteins.

Furthermore by reaction of a cross-linked insoluble polymer and a protein an unsoluble polymer-protein complex is provided.

The polymers which are the object of this invention can also be reacted with compounds containing other reactive groups, such as aliphatic or aromatic hydroxy groups and their metal derivatives, such as alcoholates and phenolates. The polymers described above are also of interest in the field of textile finishing. As a result of the reaction of polymers containing 2,4-dinitro-5-fluoro-phenyl groups with dyes containing corresponding reactive groups, such as amino- and hydroxy-groups, non diffusing dyes of large molecular weight are produced.

On the other hand the surface properties of textile fibers can be enhanced by reacting them with said polymers. In particular, a portion of the available 2,4-dinitro-5-fluoro-phenyl groups may be firmly bonded to dye stuffs possessing the groups above mentioned and the remainder of the 2,4-dinitro-5-fluoro-phenyl groups are available to ensure a strong chemical bonding between the dye thus formed and fibers, such as wool, cellulose, and silk, which themselves possess groups capable of reaction. In this way, such fibers may be colored with a dye which does not diffuse and is especially stable to washing. An additional advantage in many cases resides in the fact that the firm bonding of the polymeric substance to textile fibers, such as silk and wool, may substantially improve such properties as dyeability, water absorption, and the like.

*Example 1.—Preparation of a reactive insoluble polymeric carrier substance*

To a substance of 7.5 gm. methacrylic acid, 5 gm. of m-fluoroanilide of methacrylic acid and a 50% solution of 250 mg. divinyl-benzene in benzene, 25 mg. benzoyl-peroxide are added. This mixture is polymerized in a nitrogen-atmosphere in a Carius-tube for 24 hours at 60° C. The yield is 12 gm. of copolymer.

5 gm. of the obtained copolymer are slowly added to a nitration mixture of 30 ml. of nitric acid (D=1.52) and 90 ml. of sulfuric acid (D=1.84) and reacted under continuous stirring for 2 hours at a temperature below 0° C. The reaction mixture is then poured on ice, washed with water until it is neutral and dried. The product consists of 5.8 gm. of a yellow resinous substance.

*Example 1a.—Preparation of an active insoluble polymeric enzyme complex and measurement of its activity*

500 mg. of copolymer prepared according to Example 1 was suspended in a solution of 10 ml. "Invertin" (Merck) and 40 ml. of n/10 NaHCO$_3$ and stirred for 7 hours at room temperature. The thus transformed polymer was washed with altogether 500 ml. of n/10 acetate-buffer solution (pH 4.5), kept in buffer solution overnight, washed next along with further 500 ml. of buffer solution. It was kept further on in n/10 acetate-buffer solution of pH 4.5 for 7 days under refrigeration, filtered and suspended in 50 ml. of a 6.5% saccharose-buffer solution (n/10 acetate, pH 4.5). The substrate was sampled after periods of 12, 30, 60 and 120 minutes.

The 5 ml. samples were analyzed for glucose by the dinitro-salicilic acid method of Summer.

After 12 min.: 6.5 mg. glucose (13 mg. invert sugar)
After 30 min.: 22.6 mg. glucose (45.2 mg. invert sugar)
After 60 min.: 41.6 mg. glucose (82.2 mg. invert sugar)
After 120 min.: 85.1 mg. glucose (170.2 mg. invert sugar)

*Example 1b.—Preparation of an active insoluble polymer-albumine complex*

5 ml. of a rabbit serum was diluted with n/10 NaHCO$_3$ to 100 ml. 100 mg. resin prepared according to Example 1 was suspended in 20 ml. of the serum solution which contained 57.3 gm. serum-albumine. The suspension was stirred at room temperature in a 50 ml. glass stoppered Erlenmeyer flask for 24 hours and then washed with 600 ml. water. It was found that the polymer had bound 23 mg. of the serum albumine.

*Example 1c.—Addition of p-aminobenzoic acid to the new polymer*

100 mg. of the polymer prepared according to Example 1 is suspended in 40 ml. of n/10 NaHCO$_3$, a p-aminobenzoic acid solution containing 152 mg. p-aminobenzoic acid, and stirred for 24 hours at room temperature. The resin binds 16.0 mg. of p-amino-benzoic acid.

*Example 2.—Preparation of a soluble reactive polymer*

5 gm. of the m-fluoroanilide of methacrylic acid (87 mmol) and the mixture heated at 50° C. for 24 hours in a sealed Carius tube. After cooling an ivory colored, hard polymer is obtained which is then crushed and sieved. The yield is 12 gm. of copolymer. Batches of 1 gm. of this copolymer are nitrated at 0–3° C. for 1 hour with a mixture of 10 gm. HNO$_3$ and 30 gm. H$_2$SO$_4$, whereby the nitration mixture is added slowly at 0° C. to the polymer. The product is poured on ice and washed to neutrality (8–10 days) and dried in vacuo over P$_2$O$_5$. The product is a resin of lemon yellow colour.

What is claimed is:
1. The polymer formed by copolymerizing the m-fluoroanilide of methacrylic acid at a temperature from 20° C. to 100° C. with at least one member selected from the group consisting of acrylic acid, methacrylic acid and divinyl benzene, and nitrating the resulting copolymer with a mixture of sulfuric and nitric acids at a temperature below 0° C. to produce a polymer having 2,4-dinitro-5-fluoro-phenyl groups.
2. The polymer as in claim 1 wherein acrylic acid is copolymerized with the m-fluoroanilide of methacrylic acid.
3. The polymer as in claim 1 wherein methacrylic acid is copolymerized with the m-fluoroanilide of methacrylic acid.
4. The polymer as in claim 1 wherein methacrylic acid and divinyl benzene are copolymerized with the m-fluoroanilide of methacrylic acid.
5. A process which comprises copolymerizing the m-fluoroanilide of methacrylic acid at a temperature from 20° C. to 100° C. with at least one member selected from the group consisting of acrylic acid, methacrylic acid and divinyl benzene, and nitrating the resulting copolymer with a mixture of sulfuric and nitric acids at a temperature below 0° C. to produce a polymer having 2,4-dinitro-5-fluoro-phenyl groups.
6. A process as in claim 5 wherein acrylic acid is copolymerized with the m-fluoroanilide of methacrylic acid.
7. A process as in claim 5 wherein methacrylic acid is copolymerized with the m-fluoroanilide of methacrylic acid.
8. A process as in claim 5 wherein methacrylic acid and divinyl benzene are copolymerized with the m-fluoroanilide of methacrylic acid.

(References on following page)

References Cited by the Examiner

UNITED STATES PATENTS

| | | | |
|---|---|---|---|
| 2,118,945 | 5/1938 | Reppe | 260—80.5 |
| 2,118,946 | 5/1938 | Reppe | 260—805 |
| 2,202,169 | 5/1940 | Schlack | 8—127.6 |
| 2,250,930 | 7/1941 | Evans | 8—127.6 |
| 2,332,521 | 10/1943 | Masucci | 167—78 |
| 2,398,077 | 4/1946 | Smith | 195—62 |
| 2,526,961 | 10/1950 | Meier | 167—78 |
| 2,893,920 | 7/1959 | Grant et al. | 195—62 |
| 2,894,987 | 7/1959 | Stein | 260—563 |
| 2,945,063 | 7/1960 | Quinn | 260—563 |

OTHER REFERENCES

Manecke, G. and Singer, S.: Makromol. Chem., 39, 13–25 (1960).

D. H. Campbell, E. Luescher and L. S. Lerman: Proc. Nat. Acad. Sci., USA, 37, 575 (1951).

N. Grubhofer and L. Schleith: Z. Physiol. Chem. 297, 108 (1954).

A. Skogseid: Dissertation, Oslo 1958.

H. C. Isliker: Ann. N. Y. Acad. Sci., 57, 225 (1953).

JOSEPH L. SCHOFER, *Primary Examiner.*

HAROLD N. BURSTEIN, JAMES A. SEIDLECK, MAURICE WOLK, *Examiners.*